(12) United States Patent
Uriel

(10) Patent No.: US 7,708,136 B2
(45) Date of Patent: May 4, 2010

(54) CARRIER PUCK

(75) Inventor: Eli Uriel, Bronx, NY (US)

(73) Assignee: Turbofil Packaging Machines, LLC, Mount Vernon, NY (US)

( * ) Notice: Subject to any disclaimer, the term of this patent is extended or adjusted under 35 U.S.C. 154(b) by 1019 days.

(21) Appl. No.: 11/407,363

(22) Filed: Apr. 20, 2006

(65) Prior Publication Data

US 2007/0267096 A1    Nov. 22, 2007

(51) Int. Cl.
    *B65B 37/00*      (2006.01)
    *B65B 3/04*      (2006.01)

(52) U.S. Cl. ............................ 198/803.11; 198/867.11; 198/867.12; 141/165; 141/168; 141/378

(58) Field of Classification Search ................. 141/165, 141/168, 170, 378; 198/867.2, 867.8, 867.11, 198/867.12, 803.11
See application file for complete search history.

(56) References Cited

U.S. PATENT DOCUMENTS

| | | | |
|---|---|---|---|
| 3,090,478 A | 5/1963 | Stanley | |
| 4,159,762 A | 7/1979 | Bulwith | |
| 4,807,421 A | 2/1989 | Araki et al. | |
| 5,479,762 A * | 1/1996 | Bliss | 53/490 |
| 5,484,052 A | 1/1996 | Pawloski | |
| 5,509,524 A * | 4/1996 | Ohmori et al. | 198/465.1 |
| 6,176,369 B1 * | 1/2001 | Petrovic | 198/867.11 |
| 6,317,648 B1 * | 11/2001 | Sleep et al. | 53/500 |
| 6,522,945 B2 * | 2/2003 | Sleep et al. | 53/52 |
| 6,971,506 B2 * | 12/2005 | Hassinen et al. | 198/803.14 |

* cited by examiner

*Primary Examiner*—Gregory L Huson
*Assistant Examiner*—Nicolas A Arnett
(74) *Attorney, Agent, or Firm*—Evelyn M. Sommer

(57) ABSTRACT

A carrier puck is provided which can be adjusted quickly with minimal efforts, such as by using a slider, screw or other mechanical means, to allow a wide range of article shapes and sizes to be accommodated on the processing line. The carrier puck comprises a base piece, at least two substantially identical holding pieces piled in two or more stacks, a means for securing each of the stacks of holding pieces, and a means for adjusting the distance between the stacks. The two or more stacks of holding pieces enclose a void therebetween for accommodating a container. The distance between the stacks can be adjusted quickly with minimal efforts to accommodate containers of different sizes, shapes and contours.

3 Claims, 8 Drawing Sheets

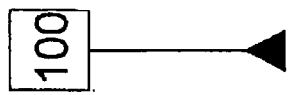
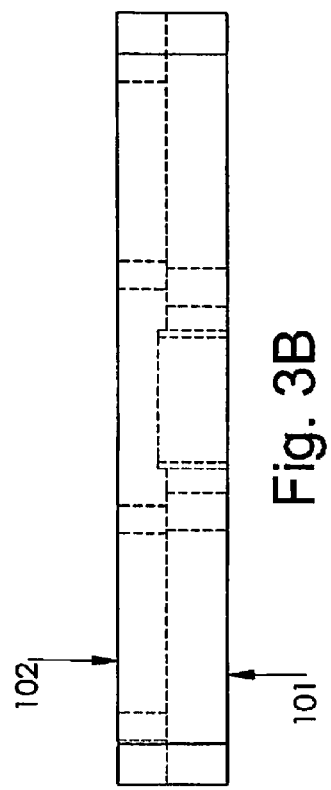
Fig. 3B
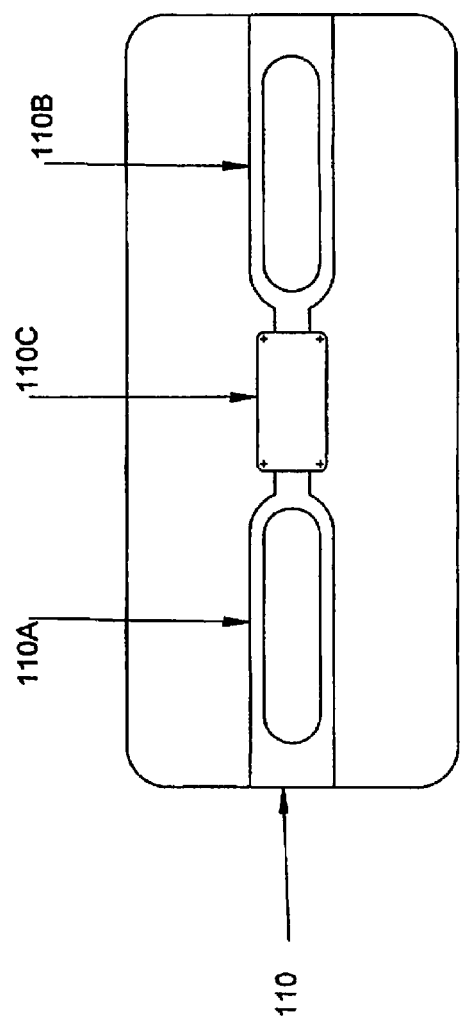
Fig. 3A

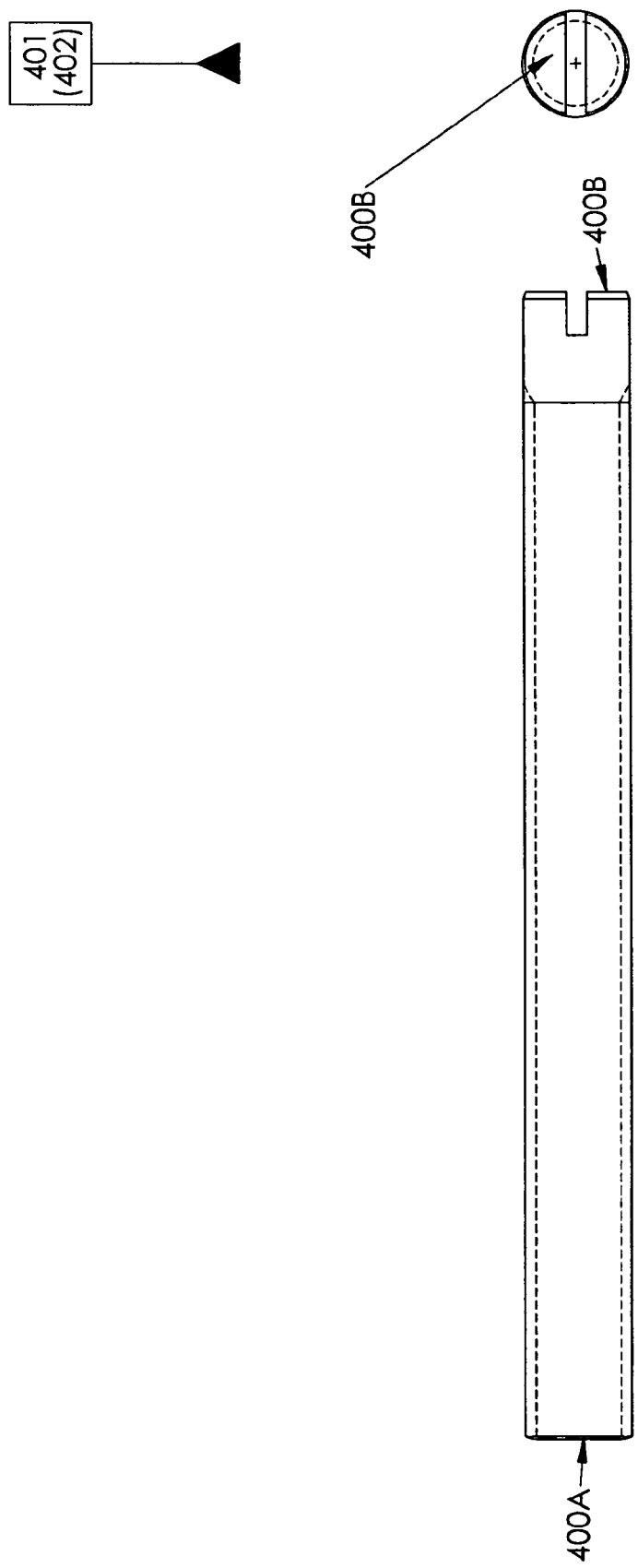

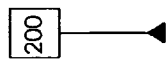
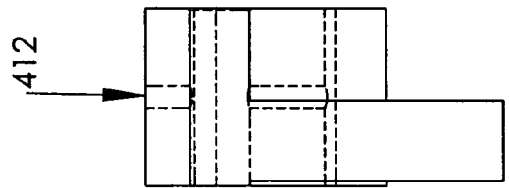
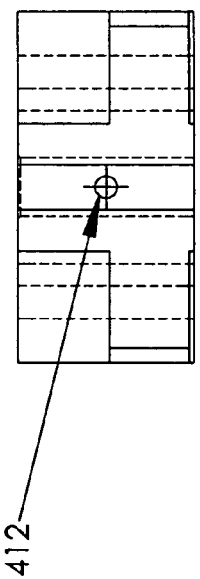
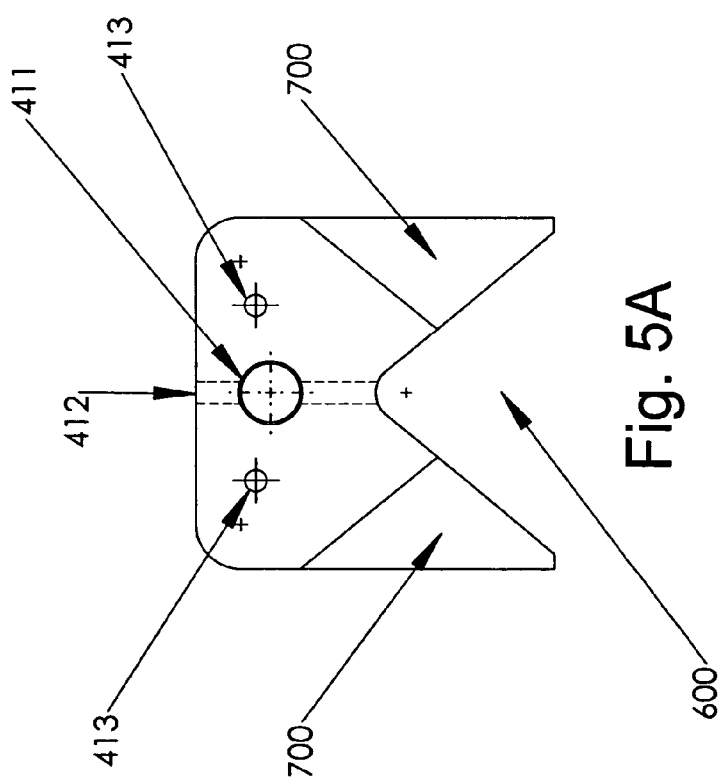
Fig. 5A
Fig. 5B
Fig. 5C

CARRIER PUCK

BACKGROUND OF THE INVENTION

The present invention relates to carrier pucks for receiving and supporting objects to be moved along a processing line and, more particularly, to carrier pucks capable of receiving and supporting objects of more than one size and/or shape and to carrier pucks having improved stabilizing capacities.

Carrier pucks are common in the prior art. Such pucks are used to receive, support and stabilize articles, for example containers in the form of bottles, cans, etc., to be moved along a processing line, in particular, automatic and semi-automatic filling and assembly lines. Movement of the pucks and, hence, the articles carried therein, is effected via a conveyor. The conveyor may comprise a moving belt extending between opposing guide rails which act to maintain the pucks properly positioned on the moving belt.

Conventional approaches for transferring the containers include carrying devices which are specifically molded so as to conform to specific individual container dimensions, shapes and configurations. Consequently, it will be appreciated that, for each new container which is to be transferred, an individual carrying device must also be fabricated so as to generally conform to the container dimensions, shapes and configurations. Obviously, the foregoing presents significant disadvantages in that each time a new product line is being transferred by a different container, the manufacture of corresponding carrying devices therefore represents considerable costs. In practice, by reason of the foregoing particular approach, other significant shortcomings are encountered, such as the procurement costs and ordinary lead times involved for ordering each of the new carrying devices. A further drawback associated with this particular approach is the need for consequent storage facilities which must be provided for whenever these carriers are not utilized.

Aside from the foregoing disadvantages, it will be understood that each time there is a changeover from one container to another, thereby necessitating the formation and use of a different specific carrying device therefor, considerable handling costs are normally involved in replacing these carrying devices on the conveying apparatus. This factor, of course, further adds to the overall costs involved during a changeover operation. Another disadvantage is the necessity to adjust the conveying device to accommodate pucks of different sizes. In addition, prior molded type carrying devices must be produced with a relatively loose fit so as to provide a loading and unloading clearance for the containers during transit, loading and unloading. As a result of such clearance, there exists a likelihood that during transit the containers might be moved such that damage might occur thereto. In this latter regard, the carrying devices would fail to perform their intended function. Other shortcomings associated with the minimum loading clearance are that it not only adds extra machining costs to changeover but, also, there exists the inability of the carriers to accept so-called "out of spec" containers.

From the foregoing considerations, it will be recognized that conventional carrying devices, particularly of molded type, are unable to effectively, simply and reliably provide a single or common carrier particularly adapted for carrying and positively holding containers of various dimensions and/or shapes without requiring changeover type adjustments being made to the carrying device itself for carrying different containers.

A few proposals have been made in the art providing limited solutions to the problems discussed above.

U.S. Pat. No. 3,090,478 discloses a container carrier capable of holding containers of various sizes and shapes by incorporating an exchangeable insert in a common shell and each kind of insert has a unique inside cavity designed to accommodate a container of a specific size/shape.

U.S. Pat. No. 4,159,762 discloses an article transporting device for transferring containers of different dimensions using a gripping means generally in the form of integral plates arranged to face each other, each having a central section and a pair of angularly oriented flat plate portions.

U.S. Pat. No. 4,807,421 discloses a flexible container holder for holding containers of various sizes and shapes comprising a deformable holding member generally in the form of multiple tongues, a holding frame and an adapter plate.

U.S. Pat. No. 5,484,052 provides an improved carrier puck capable of receiving and supporting one of at least first and second articles, each having different dimensions and an improved carrier puck capable of receiving and supporting an article having walls which are not generally straight. For the first aspect, the carrier puck comprises a main body having a first cavity of a first size and a second cavity of a second size which differs from the first size. The first cavity is adapted to receive and support the first article and the second cavity is adapted to receive and support the second article. For the second aspect, the carrier puck has at least one gripper element extending from an inner side wall of the main body to the cavity for engaging with the protruding ridge on the article to releasably hold and stabilize the article in the puck. It is apparent that the improvement is still limited as to the kind and shape of the articles that can be accommodated. The requirement of one or more protruding ridges on the article also imposes inconvenient restrictions.

It is an object of the present invention to provide a carrier puck which can be adjusted quickly, cheaply and easily for receiving and supporting one of a wide range of containers of different sizes.

It is a further object of the present invention to provide a carrier puck which can be adjusted quickly, cheaply and easily for receiving and supporting one of a wide range of containers of different heights, shapes and contours, including containers with non-flat bottoms.

It is also an object of the present invention to provide a carrier puck for receiving and supporting an article which tends to be unstable when left to stand by itself unsupported.

It is yet another object of the present invention to provide a carrier puck which can be easily and quickly dissembled and assembled.

It is a further object of the present invention to provide a carrier puck which can be sanitized and/or autoclaved and are suitable for clean operations.

It is still another object of the present invention to provide a filling machine that uses the carrier pucks of the present invention, which does not need to stop the conveying mechanism when the containers are being filled in a stationary filling station.

These and other objects and advantages of the present invention will be apparent from the following description, the accompanying drawings and the appended claims.

SUMMARY OF THE INVENTION

The need is met by the present invention wherein a carrier puck is provided which can be adjusted quickly with minimal efforts, such as by using a slider, screw or other mechanical means, to allow a wide range of article shapes and sizes to be accommodated on the processing line. The carrier puck of the present invention is especially advantageous for unstable containers.

According to the first embodiment of the invention, the improved adjustable carrier puck comprises a base piece, at least two substantially identical holding pieces piled in two stacks, a means for securing the stack of holding pieces to ensure that all the holding pieces in a stack move in a synchronized manner on top of the base piece, and a means for adjusting the distance between the two stacks. Each of the holding pieces has a generally V-shaped opening. The holding pieces are located on top of the base piece forming one or more stacks, with the openings pointing inward and clustering to form a void, which serves as the cavity for accommodating the containers. Two stack-securing means, generally in the form of two pins, rods or shafts, are provided and attached to the base piece and each penetrates the corresponding stack through the matching hole in the respective holding piece. The distance between the stacks can be adjusted quickly with minimal efforts through an operation on the adjusting means. During the adjustment, the size of the void is adjusted accommodating containers of different sizes. Since the exact match between the outer surface of the container and the inner surface of the holding pieces is not required for a steady holding, the carrier puck of the present invention can accommodate containers of different shapes and contours.

BRIEF DESCRIPTION OF THE DRAWINGS

FIGS. 3A-3B are different views of a base piece of a carrier puck formed in accordance with the present invention. FIG. 3A is a top view from the 101 side of the base piece and FIG. 3B is a side view.

FIGS. 4A-4B are different views of a rod as a part of a first embodiment of the adjusting means in accordance with the present invention. FIG. 4A is a first side view and FIG. 4B is a second side view.

FIGS. 5A-5C are different views of a first embodiment of the holding piece in accordance with the present invention. FIG. 5A is a top view. FIG. 5B is a first side view and FIG. 5C is a second side view.

DETAILED DESCRIPTION OF THE INVENTION

Figure 1:
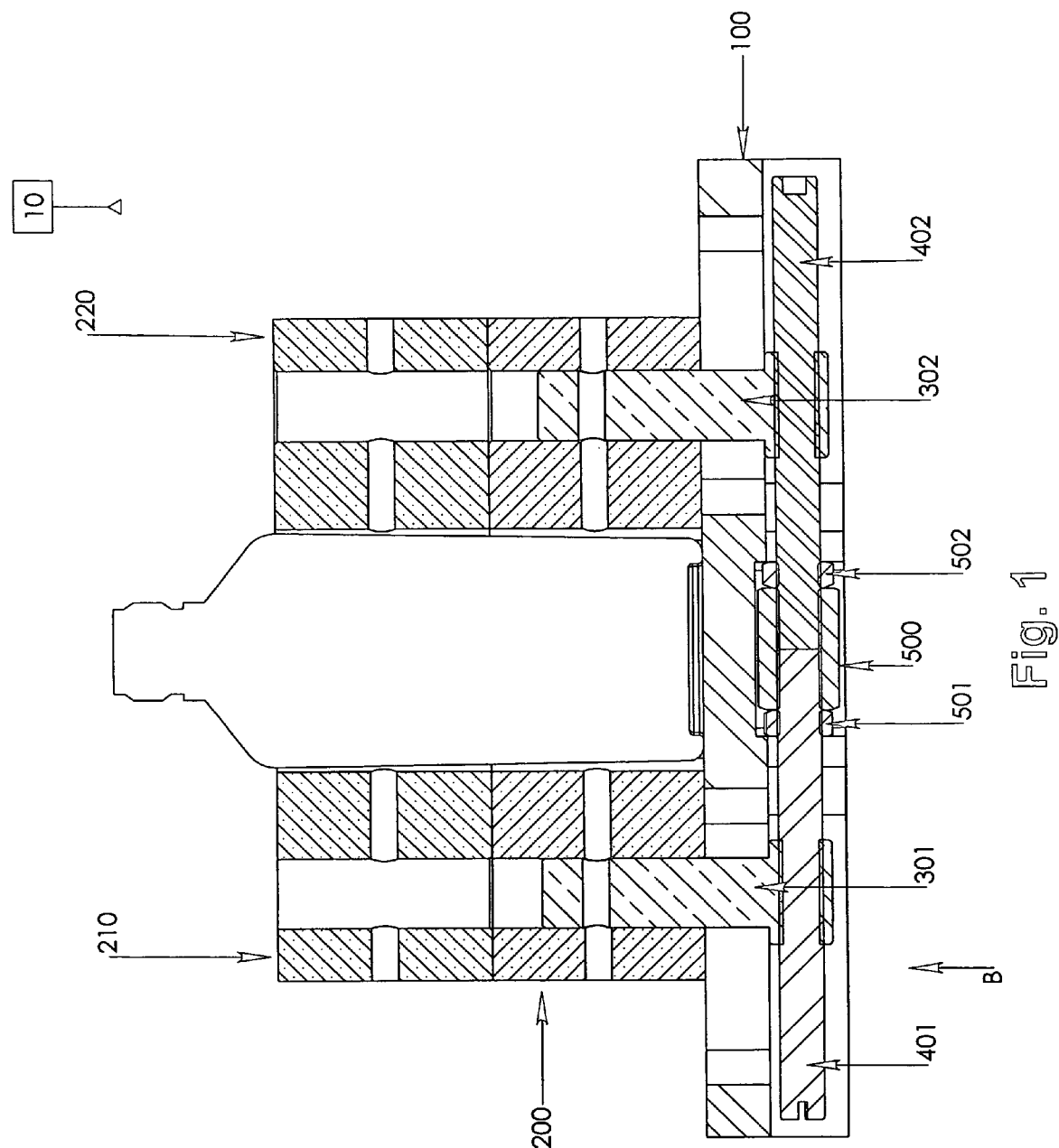
FIG. 1 is a sectional view of a carrier puck formed in accordance with the present invention including a bottle.

A carrier puck formed in accordance with the present invention is shown in FIGS. 1-6 and is generally designated by the reference number 10. The carrier puck 10 comprises a base piece 100, two or more holding pieces 200 located on top of the base piece in the form of two stacks 210 and 220, stack-securing means, 301 and 302, for holding the stacks in position and adjusting means, 401 and 402, for adjusting the distances between the stacks.

Figure 2:
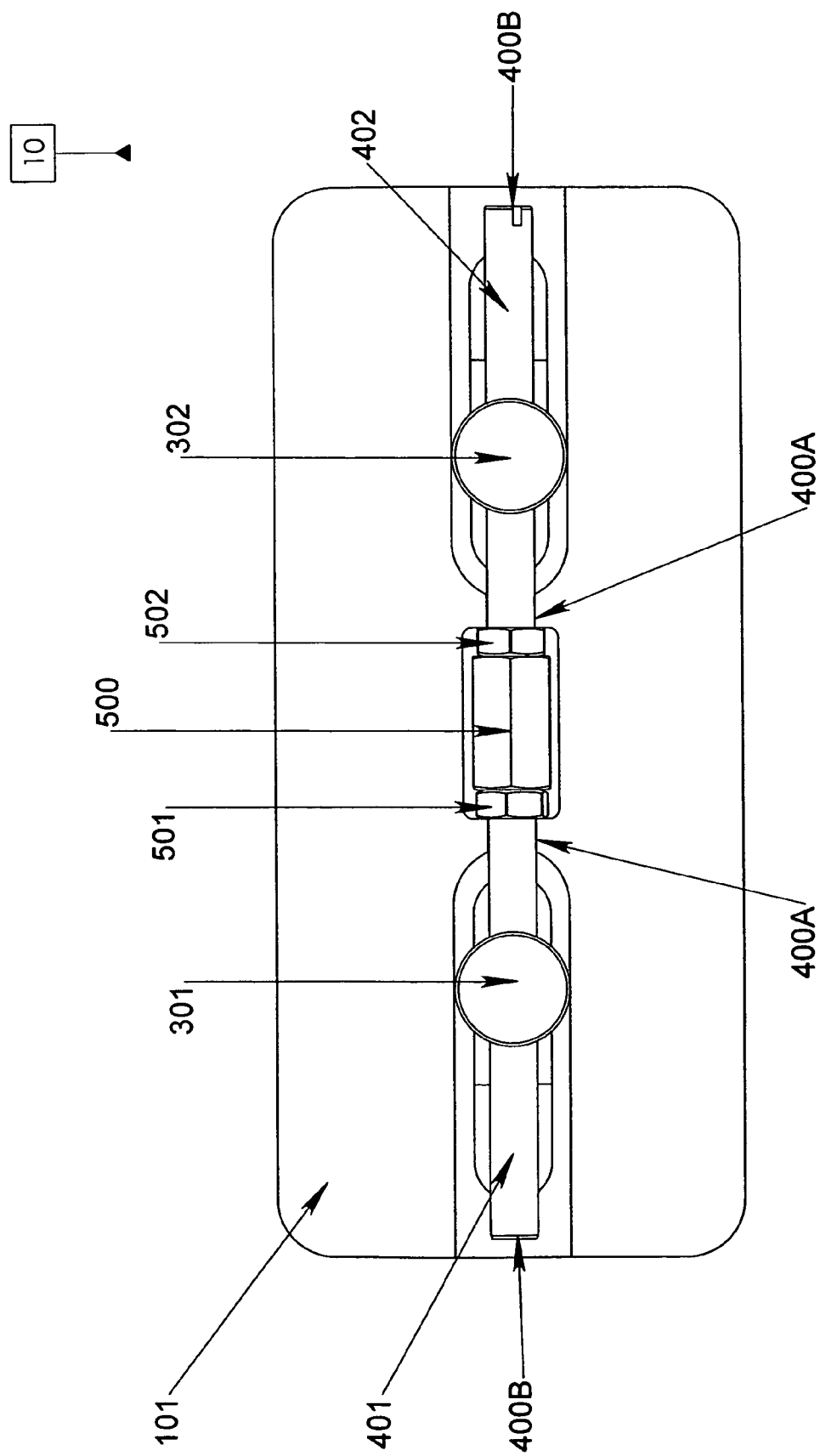
FIG. 2 is a view of a carrier puck formed in accordance with the present invention, viewed from the direction shown as B in FIG. 1.

The structure of the base piece is best illustrated in FIG. 2 and FIGS. 3A-3B. The base piece 100 is generally rectangular in shape. The base piece has a first surface 101 which is contact with the side of the base or surface of the processing line when in use, and a second surface 102 which is in contact with the holding pieces when in use. A groove 110 is provided running the full length in the longitudinal direction of the base piece on the surface 101. The groove 110 can be further dissected into three sections of voids, the first section 110A for accommodating the first part of the adjusting means 401 and one end of the first stack-securing rod 301, the second section 110B for accommodating the second part of the adjusting means 402 and one end of the second stack-securing rod 302 and the third section 110C, located between 110A and 110B, for accommodating in a fixed position the third part of the adjusting means. Two slots are provided on the 102 side of the base piece, each allowing a stack-securing rod to penetrate the base piece.

In a preferred embodiment, the first and second parts of the adjusting means are a screw 401 (402) as illustrated in FIGS. 4A-4B. The third part of the adjusting means is preferably a union 500 which is basically a cylindrical body with a threaded through-hole or a threaded opening at each end along the longitudinal direction of the base piece. 401 and 402 each has a first end, 400A, threaded to be able to connect with one end of the union 500, via 501 (502) jam nuts for securely locking 401 (402) to 500, and a second end 400B, adapted for engagement with a screwdriver. 401 and the corresponding end of the stack-securing rod 301 (similarly 402 and 302) are interlocked so that the rotary movement of 401 (or 402) about an axis parallel to the longitudinal direction of the groove is permitted without significant impediment from the rod 301 (or 302), while the longitudinal movement of 401 (or 402) along the longitudinal direction of the groove is coupled to the longitudinal movement of the rod 301 (or 302). The stack-securing rod 301 is engaged with 401 and so is 302 with 402. Using a screwdriver to turn the adjusting means 401 and 402, an operator can move 401 and 402 in or out of the union 500 and cause the stack-securing rods, and the stacks of holding pieces attached thereon, to move along the longitudinal direction of the base piece.

The holding piece, as illustrated in FIGS. 5A-5C, is a unitary body with a generally V-shaped opening 600 on one side. The V-shaped opening preferably has an angle of 80°, but can certainly have any angle that is optimally suitable for accommodating containers of different sizes and shapes. A portion 700, generally in the shape of a triangle and preferably an isosceles triangle, is removed from each of the prongs enclosing the V-shaped opening. The removal of the triangular portion allows two directly opposing pieces of holding pieces (the two V-openings facing each other), each of which belong to a different stack but at the same level above the base piece, to move in a matching and overlapping manner toward or away from each other to define a void therebetween for tightly and securely accommodating a container of a wide range of sizes and shapes therein, which would have been impossible otherwise. The holding piece has a first through-hole 411, which upon stacking of more than one holding piece, forms a long hole through which the stacking-securing rod 301 or 302 can be inserted to hold the first holding piece in place. The holding piece has a second through-hole 412, which is perpendicular to and intersecting with the first hole 411 and whose function will be explained infra. The number of holding pieces in each stack is related to the height of the container. Preferably, the holding piece has at least one more through-hole, 413, which is parallel to 411. When the holding pieces are stacked, the holes 413 align and a rod can be inserted therein to prevent any individual holding piece from undergoing a rotary motion about an axis parallel to the rod 301 or 302. Preferably, two holes 413 are provided in a symmetrical manner relative to the hole 411 as illustrated in FIGS. 5A-5C. Only the bottom-most holding piece in each stack is held directly to the base piece by the securing rod 301 (302), and the rest are held to the bottom-most holding piece by the pins in the 413 through-holes which are part of each holding piece. In an alternative embodiment, the securing rod 301 (302) is extended so that it can be used to directly hold more than one holding piece to the base piece.

While the base piece and holding pieces with a preset size can be used for accommodating a large number of container size and shapes, the sizes of the base piece and the holding pieces can be varied if containers of extreme dimensions are to be used.

The base piece and the holding pieces may be formed from a metal or a polymeric material. The preferred polymeric material is a cast-filled nylon available under the commercial name of Nytralon®. The base piece and one or more of the holding pieces can be constructed from magnetized materials and the base and holding pieces can be kept in the desired relative position magnetically.

Figure 6:
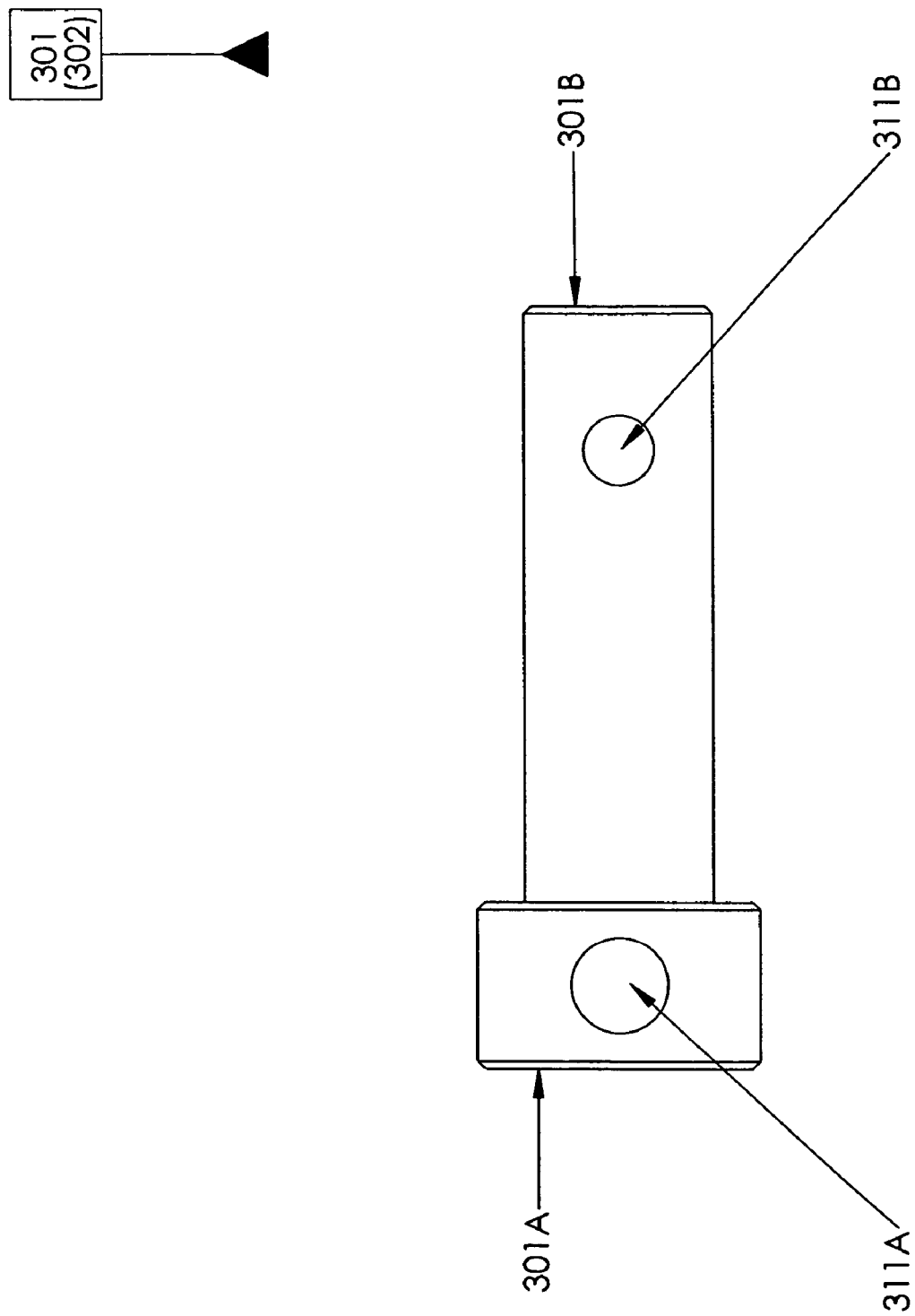
FIG. 6 is a side view of a rod as a first embodiment of the stack-securing means in accordance with the present invention.

The stack-securing means, preferably in the form of two pins, rods or shafts, is used to secure the stacks of holding pieces on top of the base piece. As illustrated in FIG. 6, the rod 301 has a first end 301A and a second end 301B. The first end is larger than the second end. The first end has a first tapped through-hole 311A running perpendicular to the longitudinal axis of the rod 301. The hole 311A is used to engage with the first part of the adjusting means 401. Adjacent to the second end 301B there is provided a second through-hole, 311B, for holding the bottom-most holding piece of each of the stack in its place by engaging with a fixing means, such as a pin, inserted into the hole 412 of the holding piece and through the hole 311B. The rod 302, securing the other stack of the holding pieces, as well as all parts engaged to 302, is designed and functions in the same manner as rod 301.

In an alternative embodiment, the securing rod 301 is extended so that it can be used to directly hold more than one holding piece to the base piece and the through-hole 311B is used to engage with the fixing means in the hole 412 of the highest holding piece reached by the extended rod 301. One or more through-holes 311C can be provided along the rod between 311A and 311B, each being parallel to 311B and at the level corresponding to the hole 412 of each of the holding pieces located between the highest holding piece reached by the extended rod 301 and the bottom-most holding piece in a stack. The provision of more than one hole (311A and at least one hole 311C for the extended rod 301) for fixing the holding pieces relative to the rod increases the stability of the stack when more than one hole is used for accomplishing the securing.

The pucks of the present invention have an advantage over conventional pucks that they can be assembled, adjusted and dissembled quickly, easily and cheaply. When they are dissembled, they comprise large parts whose external surface can be easily accessed for cleaning purposes, and the parts can be autoclaved. The ability to quickly and thoroughly clean and sanitize the pucks make them particularly suitable for filling pharmaceuticals, food and cosmetics into containers.

In use, the base piece with the stack-securing rods and adjusting means in their places and engaged as aforesaid is laid on a conveying mechanism, such as on the belt of a processing line, with the first surface 101 touching the belt. At least one holding piece, preferably an equal number of them, is placed on each side of the base piece in contact with the second surface 102. In each stack, the V-shaped openings are all facing inward and the rod 301 (302) penetrate the bottom holding pieces in the stack through the hole 411 and the base piece. In addition, each of the holding pieces is held to the stack with pins extending through holes 413. If necessary, the adjusting means at the bottom of the base piece is adjusted either manually using a screwdriver or a slider or automatically by any suitable mechanical driving means, so that the void enclosed by the two V-shaped openings between the two stacks are large enough to accommodate the containers to be placed therein. A container is then placed in the voids enclosed by the two V-openings between the two stacks. Further adjustment of the adjusting means will ensure that the container is tightly and securely held in the void by the prongs of the V-shaped openings. The conveying mechanism then moves the carrier pucks and the containers fixed therein along a predetermined path and the containers are filled when they are under a filling mechanism.

Figure 7:
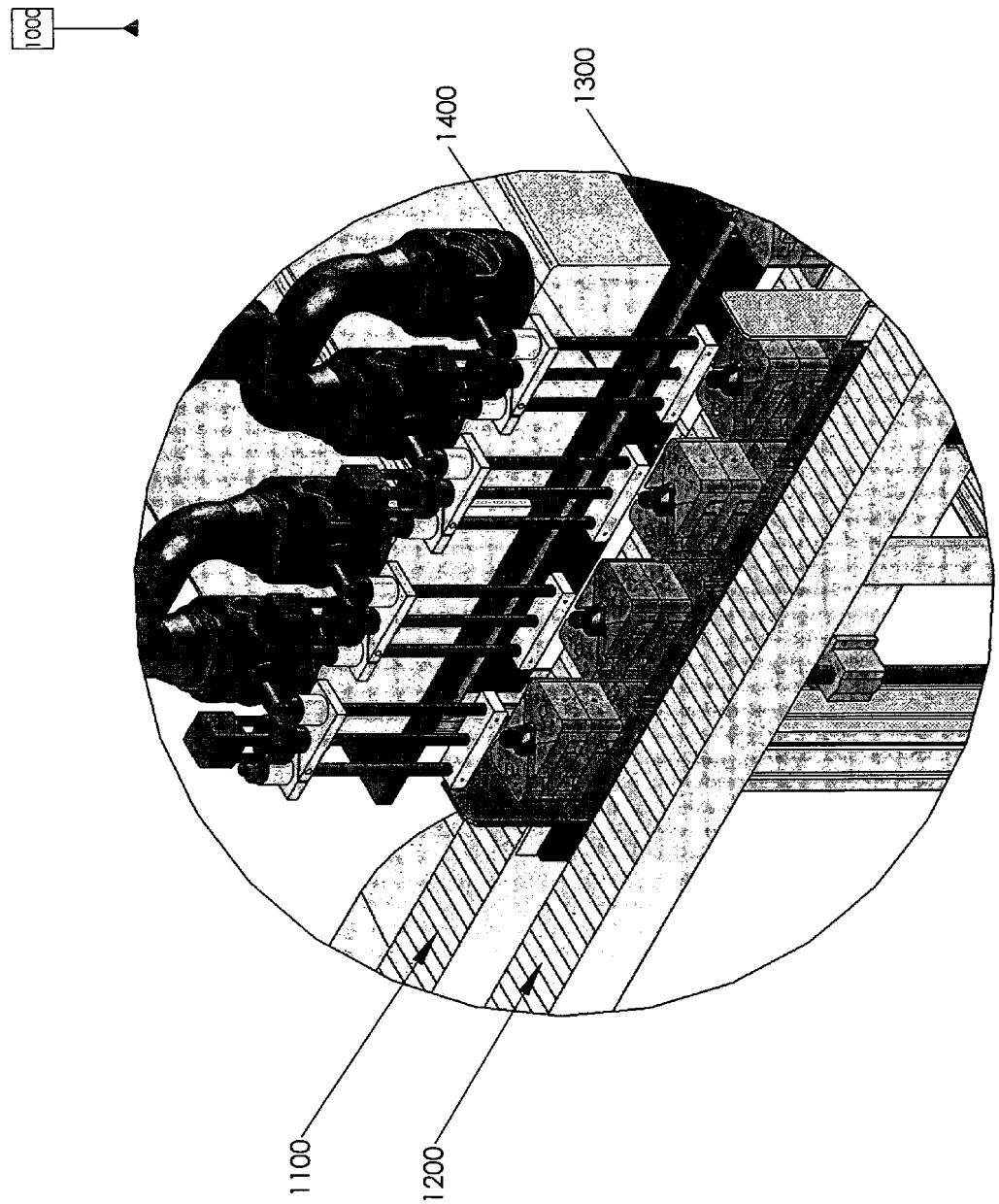
FIG. 7 and FIG. 8 are perspective views of a filling machine in accordance with a first preferred embodiment of the present invention.
Figure 8:
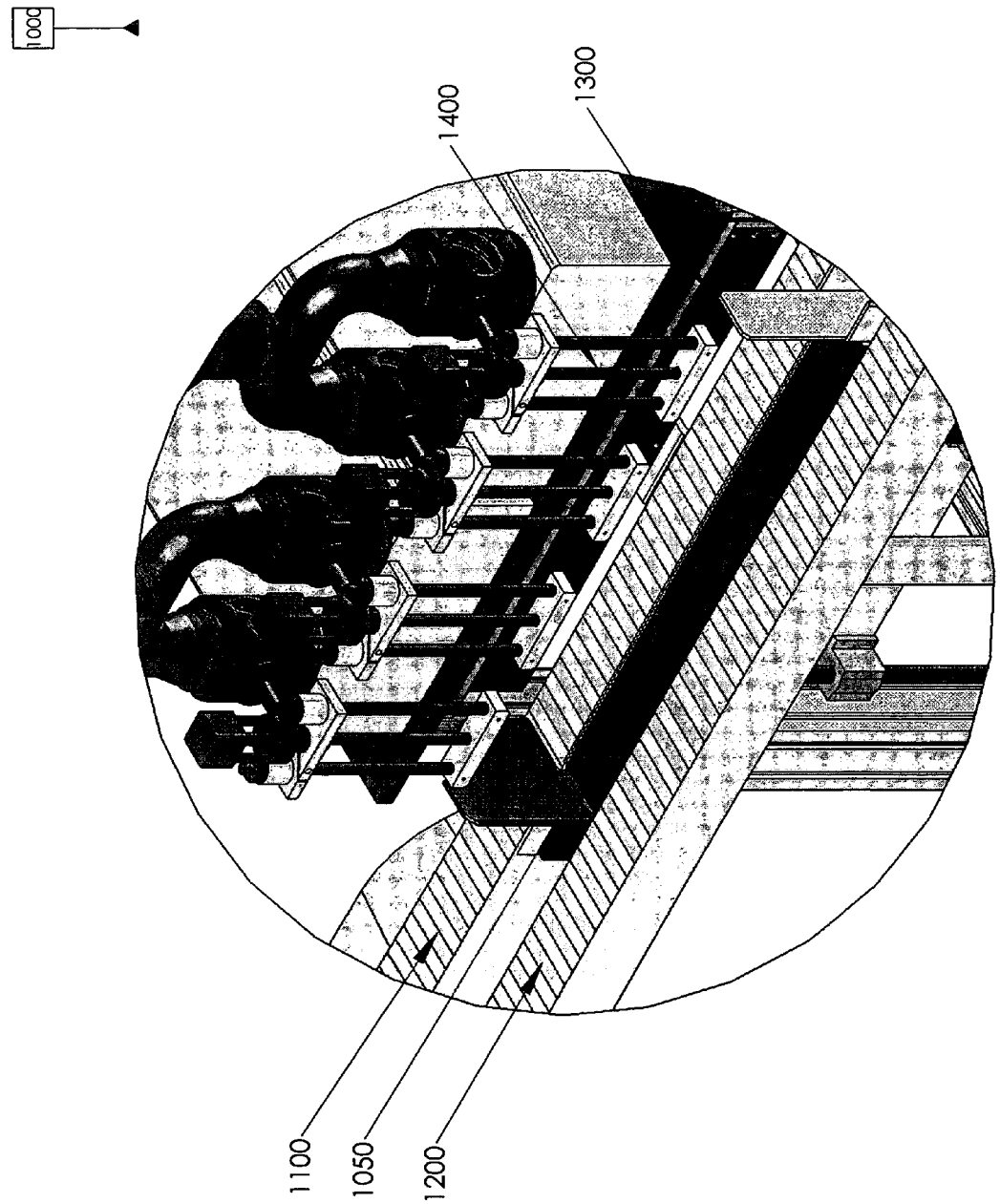

While the carrier pucks of the present invention can be used advantageously on substantially any conventional filling machine with minimum or no modification, their use provides a unique advantage on an improved filling machine contemplated by the inventors. As illustrated in FIGS. 7 and 8, the filling machine 1000, comprises a filling countertop 1050, two conveying mechanisms or two sections of a conveying mechanism (1100 and 1200) running parallel on the opposite sides of 1050 for bringing the carrier pucks and the containers held therein into and out of the filling area respectively, a pushing means 1300 for moving the carrier pucks and the containers held therein in a direction perpendicular to the movement direction of the conveying mechanism, and one or more filling heads 1400. In use, the filling heads 1400 are positioned directly above the filling countertop 1050. The containers, held in the carrier pucks of the present invention, are continuously moved by the first conveying mechanism 1100 into the filling station, which, for ease of illustration, can be broadly defined as the sum of the filling countertop and the two sections of the conveying mechanism flanking the filling countertop. As soon as each of the carrier pucks in a group of a limited number on the first conveying mechanism is lined up with a filling head, i.e., when all carrier pucks in the group are now in the filling station with matching filling heads, the pushing means is activated, moving the group of carrier pucks onto the filling countertop 1050 in a motion that is essentially perpendicular to the flow direction of the conveying mechanism. Any carrier pucks that were previously being filled on the filling countertop will be simultaneously pushed onto the second conveying mechanism 1200 which continuously move the carrier pucks away from the filling station. Once the carrier pucks are moved onto the filling countertop 1050, the filling heads are activated to dispense the intended liquid or solid material into the container. When the containers have been filled to the predetermined level, the filling heads are deactivated. The filling speed and the conveying speed of the conveying mechanisms can be matched so that at the moment the filling is finished, the next batch of containers to be filled enters the filling station and reaches the position parallel to the filling heads. Therefore, one pushing motion of the pushing means can both bring the empty containers onto the filling countertop and the filled containers off the filling countertop, removing the need for slowing or even stopping the conveying mechanism while the containers are being filled.

Having described the invention in detail and by reference to preferred embodiments thereof, it will be apparent that modifications and variations are possible without departing from the scope of the invention defined in the appended claims. For example, it is also contemplated in this invention to use more than two stacks of holding pieces to hold the container in a carrier puck. More stacks in a carrier puck generally lead to more stable holding of the containers located therebetween.

What is claimed is:

1. A carrier puck for receiving and supporting an article of a wide range of heights, shapes and sizes and allowing the quick switching from an article of a first shape and/or size to an article of a second shape and/or size, said carrier puck comprising,
   a base piece,
   at least two holding pieces, each having an opening on a first side, wherein said opening has a generally V-shape for accommodating articles of different sizes and shapes, wherein at least one of said holding pieces is placed on top of said base piece in a first stack by overlaying said holding pieces on top of one another and at least one of said holding pieces is placed on top of said base piece in a second stack by overlaying said holding pieces on top of one another, and wherein said opening of each of said holding pieces in said first stack is aligned forming a first void in said first stack, said opening of each of said holding pieces in said second stack is aligned forming a second void in said second stack, and said first void and said second void face each other combining to form a third void for accommodating said article when said article is present,
   a first stack-securing means for securing said first stack of said holding pieces on top of said base piece,
   a second stack-securing means for securing said second stack of said holding pieces on top of said base piece, wherein both first and second stack-securing means ensure that all said holding pieces in a stack move in a synchronized manner on top of said base piece, and
   a means for adjusting the distance between said first stack of said holding pieces and said second stack of said holding pieces, wherein said means for adjusting distance and a corresponding end of said stack-securing means are interlocked so that rotary movement of said adjusting means about an axis parallel to a longitudinal direction of adjustment is permitted without significant impediment from said stack-securing means and whereby longitudinal movement of said adjusting means along said longitudinal direction of adjustment is coupled to said longitudinal movement of said stack-securing means.

2. A container filling device for filling containers of different dimensions, shapes, heights and/or contours, along a predetermined path, comprising at least one carrier puck according to claim 1, at least one conveying mechanism, and a filling mechanism, wherein at least one said container is held in one of said carrier pucks, said carrier pucks are transported by said conveying mechanism to a filling station, and said containers are filled to a predetermined level when said containers are positioned under said filling mechanism.

3. A container filling device according to claim 2, wherein said at least one conveying mechanism comprises a first conveying section for continuously moving said carrier pucks containing containers to be filled into said filling station, and a second conveying section for continuously moving said carrier pucks containing filled containers away from said filling station, wherein said first conveying section and said second conveying section run parallel, wherein said container filling device further comprises a filling countertop enclosed between said first conveying section and said second conveying section, wherein said container filling device further comprising a pushing means for, when activated, moving at least one of said containers to be filled from said first conveying section to said filling countertop and simultaneously moving said filled containers from said filling countertop to said second conveying section, wherein said filling mechanism fills said containers to be filled to said predetermined level when said containers to be filled are located on top of said filling countertop.

* * * * *